United States Patent
K et al.

(10) Patent No.: US 11,665,089 B2
(45) Date of Patent: May 30, 2023

(54) MECHANISM FOR HITLESS RESYNCHRONIZATION DURING SDN CONTROLLER UPGRADES BETWEEN INCOMPATIBLE VERSIONS

(71) Applicant: Telefonaktiebolaget LM Ericsson (publ), Stockholm (SE)

(72) Inventors: Faseela K, Bengaluru (IN); Nobin Mathew, Bangalore (IN); Vyshakh Krishnan C H, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 56 days.

(21) Appl. No.: 17/257,102

(22) PCT Filed: Jul. 10, 2018

(86) PCT No.: PCT/IN2018/050448
§ 371 (c)(1),
(2) Date: Dec. 30, 2020

(87) PCT Pub. No.: WO2020/012491
PCT Pub. Date: Jan. 16, 2020

(65) Prior Publication Data
US 2021/0135985 A1    May 6, 2021

(51) Int. Cl.
*H04L 45/00* (2022.01)
*H04L 12/46* (2006.01)
(Continued)

(52) U.S. Cl.
CPC .......... *H04L 45/38* (2013.01); *H04L 12/4633* (2013.01); *H04L 45/64* (2013.01);
(Continued)

(58) Field of Classification Search
None
See application file for complete search history.

(56) References Cited

U.S. PATENT DOCUMENTS 9,032,386 B1    5/2015  Vaynshteyn et al.
9,049,153 B2 *  6/2015  Casado ............... H04L 41/0853
(Continued)

FOREIGN PATENT DOCUMENTS

WO    WO-2015018323 A1 *  2/2015  ......... H04L 12/4633

OTHER PUBLICATIONS

Reitblatt, M. et al., "Abstractions for Network Update", Proceedings of the ACM SIGCOMM 2012, Aug. 13, 2012, pp. 323-334, ACM.

*Primary Examiner* — Gerald A Smarth
(74) *Attorney, Agent, or Firm* — Coats & Bennett, PLLC

(57) ABSTRACT

A method is implemented by a switch in a software defined networking (SDN) network managed by a controller to achieve hitless resynchronization during a controller upgrade. The method includes installing an upgraded set of flow entries so that a packet processing pipeline of the switch includes both a non-upgraded set of flow entries and the upgraded set of flow entries, processing non-tunneled packets using the non-upgraded set of flow entries, processing tunneled packets that have a tunnel upgrade status indicator set in a tunnel header using the non-upgraded set of flow entries, while processing tunneled packets that do not have a tunnel upgrade status indicator set in a tunnel header using the upgraded set of flow entries, and processing non-tunneled packets using the upgraded set of flow entries after all switches managed by the controller have installed upgraded flow entries.

18 Claims, 9 Drawing Sheets

(51) Int. Cl.
*H04L 45/64* (2022.01)
*H04L 47/2441* (2022.01)
*H04L 49/354* (2022.01)
*H04L 69/22* (2022.01)

(52) U.S. Cl.
CPC ........ *H04L 47/2441* (2013.01); *H04L 49/354* (2013.01); *H04L 69/22* (2013.01)

(56) References Cited

U.S. PATENT DOCUMENTS

| | | |
|---|---|---|
| 9,319,338 B2 | 4/2016 | Padmanabhan et al. |
| 9,973,382 B2 | 5/2018 | Padmanabhan et al. |
| 10,075,393 B2 * | 9/2018 | Pham ...................... H04L 43/04 |
| 10,812,632 B2 * | 10/2020 | Shah ................... G06F 9/45558 |
| 2015/0049632 A1 | 2/2015 | Padmanabhan et al. |

\* cited by examiner

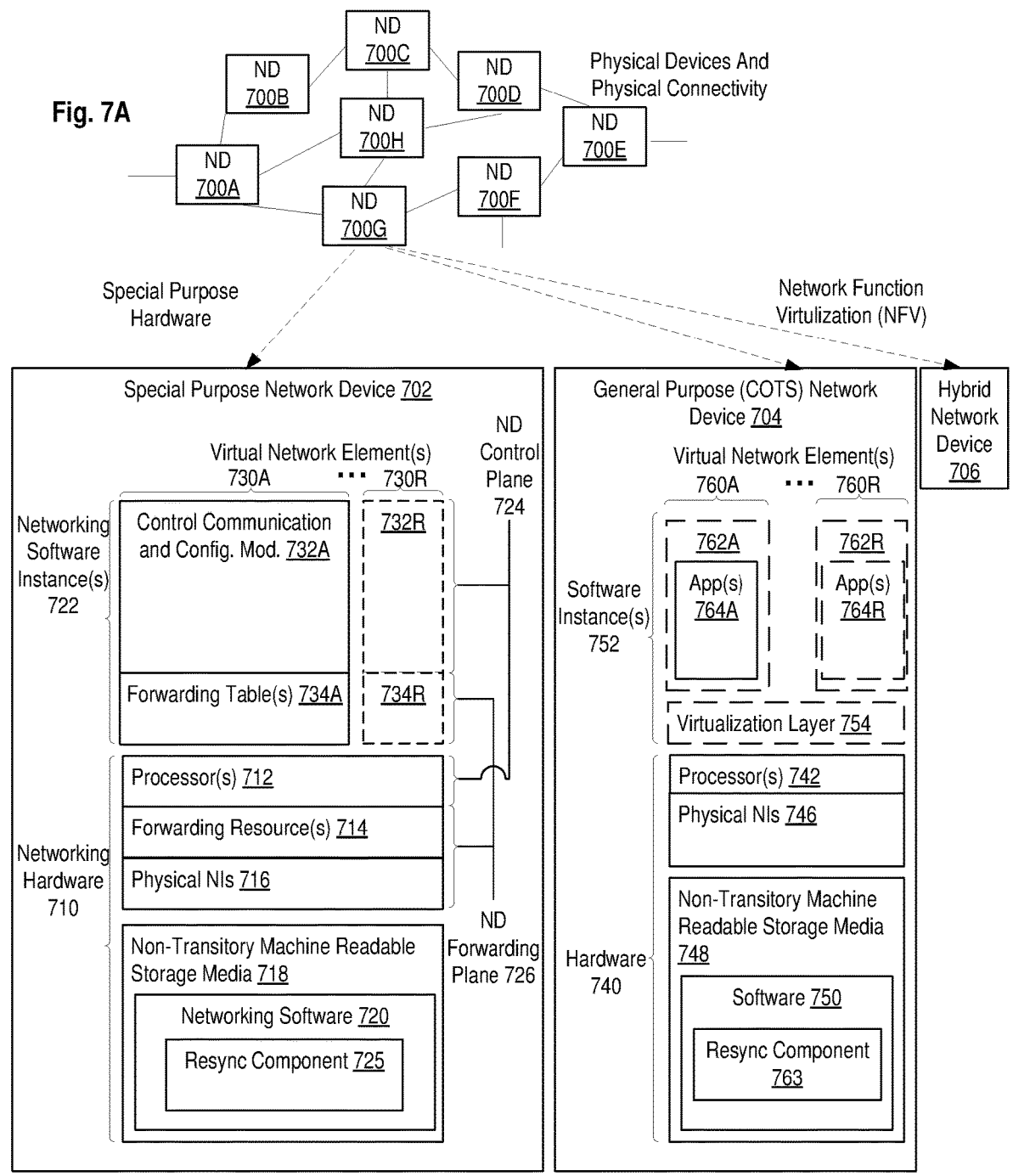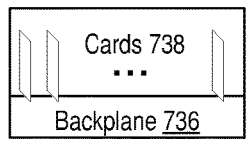

MECHANISM FOR HITLESS RESYNCHRONIZATION DURING SDN CONTROLLER UPGRADES BETWEEN INCOMPATIBLE VERSIONS

TECHNICAL FIELD

Embodiments of the invention relate to the field of software defined networking (SDN), and more specifically, to a mechanism to achieve hitless resync during an SDN controller upgrade.

BACKGROUND ART

Software defined networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure. An SDN network typically includes one or more controllers that oversee multiple switches. A controller can program the switches to implement the desired forwarding behavior.

OpenFlow is a southbound communications protocol that enables an SDN controller to program the forwarding behavior of switches in an SDN network. An OpenFlow switch includes a packet processing pipeline that includes one or more flow tables. Each flow table includes one or more flow entries, where each flow entry specifies a match condition and a set of instructions to execute when an incoming packet matches the match condition. The set of instructions may include instructions for the switch to perform various operations on the packet including, but not limited to, forwarding the packet to a given port, modifying certain bits in the packet header, encapsulating the packet, dropping the packet, and directing the packet to another flow table.

When an SDN controller is upgraded (e.g., a software upgrade), it may begin to program the switches that it manages with upgraded flow entries. However, there is no way to ensure that all of the switches install upgraded flow entries at the exact same time. As such, there can be a window of time where different switches in the SDN network have different versions of flow entries installed. For example, some of the switches may have non-upgraded flow entries installed, while some of the switches may have upgraded flow entries installed. Such inconsistent network state can cause problems with achieving hitless resynchronization (resync). Hitless resync refers to the ability to synchronize the network state without incurring traffic interruption. If there is inconsistent network state in an SDN network during synchronization where one switch in a traffic path uses non-upgraded flow entries installed, while another switch in the traffic path uses upgraded flow entries, then the traffic along the traffic path may experience interruption.

Bundle based resync is a mechanism that is used to achieve resync in SDN networks. With bundle based resync, all flow entries are combined into a single bundle and then pushed to a switch so that faster resync can be achieved. However, this mechanism does not address the problem mentioned above, as it is still possible with this mechanism that there is a window of time where different switches in the SDN network process packets using different versions of flow entries during a controller upgrade.

A stale marking mechanism is another mechanism that is used to achieve resync in SDN networks. With the stale marking mechanism, all current flow entries are marked as stale once resync starts, but traffic continues to be processed using the current flow entries until resync finishes. The expectation is that the controller will program the switches with upgraded flow entries at the end of the resync, and the stale flow entries can be removed. This mechanism also does not address the problem mentioned above, as it is still possible with this mechanism that there is a window of time where different switches in the SDN network process packets using different versions of flow entries during a controller upgrade.

SUMMARY

A method is implemented by a switch in a software defined networking (SDN) network managed by a controller to achieve hitless resynchronization during a controller upgrade, where the switch is to process packets using a non-upgraded set of flow entries before the controller upgrade, and where the switch is to process packets using an upgraded set of flow entries after the controller upgrade. The method includes installing the upgraded set of flow entries so that a packet processing pipeline of the switch includes both the non-upgraded set of flow entries and the upgraded set of flow entries, processing non-tunneled packets using the non-upgraded set of flow entries, processing tunneled packets that have a tunnel upgrade status indicator set in a tunnel header using the non-upgraded set of flow entries, while processing tunneled packets that do not have a tunnel upgrade status indicator set in a tunnel header using the upgraded set of flow entries, and processing non-tunneled packets using the upgraded set of flow entries after all switches managed by the controller have installed upgraded flow entries.

A method is implemented by a controller in a software defined networking (SDN) network managed by a controller to achieve hitless resynchronization of a switch during a controller upgrade, where the switch is to process packets using a non-upgraded set of flow entries before the controller upgrade, and where the switch is to process packets using an upgraded set of flow entries after the controller upgrade. The method includes configuring the switch to install the upgraded set of flow entries so that a packet processing pipeline of the switch includes both the non-upgraded set of flow entries and the upgraded set of flow entries, configuring the switch to process non-tunneled packets using the non-upgraded set of flow entries, configuring the switch to process tunneled packets that have a tunnel upgrade status indicator set in a tunnel header using the non-upgraded set of flow entries, configuring the switch to process tunneled packets that do not have a tunnel upgrade status indicator set in a tunnel header using the upgraded set of flow entries, and configuring the switch to process non-tunneled packets using the upgraded set of flow entries in response to a determination that all switches managed by the controller have installed upgraded flow entries.

A network device is configured to function as a switch in a software defined networking (SDN) network to achieve hitless resynchronization during a controller upgrade, where the switch is to process packets using a non-upgraded set of flow entries before the controller upgrade, and where the switch is to process packets using an upgraded set of flow entries after the controller upgrade. The network device includes a set of one or more processors and a non-transitory machine-readable storage medium having stored therein a hitless resync component. The hitless resync component, when executed by the set of one or more processors, causes the switch to install the upgraded set of flow entries so that a packet processing pipeline of the switch includes both the non-upgraded set of flow entries and the upgraded set of flow entries, process non-tunneled packets using the non-upgraded set of flow entries, process tunneled packets that have a tunnel upgrade status indicator set in a tunnel header using the non-upgraded set of flow entries while processing tunneled packets that do not have a tunnel upgrade status indicator set in a tunnel header using the upgraded set of flow entries, and process non-tunneled packets using the upgraded set of flow entries after all switches managed by the controller have installed upgraded flow entries.

A network device is configured to function as a controller in a software defined networking (SDN) network to achieve hitless resynchronization of a switch during a controller upgrade, where the switch is to process packets using a non-upgraded set of flow entries before the controller upgrade, and where the switch is to process packets using an upgraded set of flow entries after the controller upgrade. The network device includes a set of one or more processors and a non-transitory machine-readable storage medium having stored therein a hitless resync component. The hitless resync component, when executed by the set of one or more processors, causes the controller to configure the switch to install the upgraded set of flow entries so that a packet processing pipeline of the switch includes both the non-upgraded set of flow entries and the upgraded set of flow entries, configure the switch to process non-tunneled packets using the non-upgraded set of flow entries, configure the switch to process tunneled packets that have a tunnel upgrade status indicator set in a tunnel header using the non-upgraded set of flow entries, configure the switch to process tunneled packets that do not have a tunnel upgrade status indicator set in a tunnel header using the upgraded set of flow entries, and configure the switch to switch to processing non-tunneled packets using the upgraded set of flow entries in response to a determination that all switches managed by the controller have installed upgraded flow entries.

A non-transitory machine-readable medium has computer code stored therein, which when executed by a set of one or more processors of a network device functioning as a switch in a software defined networking (SDN) network, causes the switch to perform operations for achieving hitless resynchronization during a controller upgrade, where the switch is to process packets using a non-upgraded set of flow entries before the controller upgrade, and where the switch is to process packets using an upgraded set of flow entries after the controller upgrade. The operations include installing the upgraded set of flow entries so that a packet processing pipeline of the switch includes both the non-upgraded set of flow entries and the upgraded set of flow entries, processing non-tunneled packets using the non-upgraded set of flow entries, processing tunneled packets that have a tunnel upgrade status indicator set in a tunnel header using the non-upgraded set of flow entries, while processing tunneled packets that do not have a tunnel upgrade status indicator stet in a tunnel header using the upgraded set of flow entries, and processing non-tunneled packets using the upgraded set of flow entries after all switches managed by the controller have installed upgraded flow entries.

A non-transitory machine-readable medium has computer code stored therein, which when executed by a set of one or more processors of a network device functioning as a controller in a software defined networking (SDN) network, causes the controller to perform operations for achieving hitless resynchronization of a switch during a controller upgrade, where the switch is to process packets using a non-upgraded set of flow entries before the controller upgrade, and where the switch is to process packets using an upgraded set of flow entries after the controller upgrade. The operations include configuring the switch to install the upgraded set of flow entries so that a packet processing pipeline of the switch includes both the non-upgraded set of flow entries and the upgraded set of flow entries, configuring the switch to process non-tunneled packets using the non-upgraded set of flow entries, configuring the switch to process tunneled packets that have a tunnel upgrade status indicator set in a tunnel header using the non-upgraded set of flow entries, configuring the switch to process tunneled packets that do not have a tunnel upgrade status indicator set in a tunnel header using the upgraded set of flow entries, and configuring the switch to process non-tunneled packets using the upgraded set of flow entries in response to a determination that all switches managed by the controller have installed upgraded flow entries.

BRIEF DESCRIPTION OF THE DRAWINGS

The invention may best be understood by referring to the following description and accompanying drawings that are used to illustrate embodiments of the invention. In the drawings:

FIG. 7A illustrates connectivity between network devices (NDs) within an exemplary network, as well as three exemplary implementations of the NDs, according to some embodiments.

FIG. 7B illustrates an exemplary way to implement a special-purpose network device according to some embodiments.

DETAILED DESCRIPTION

Figure 1:
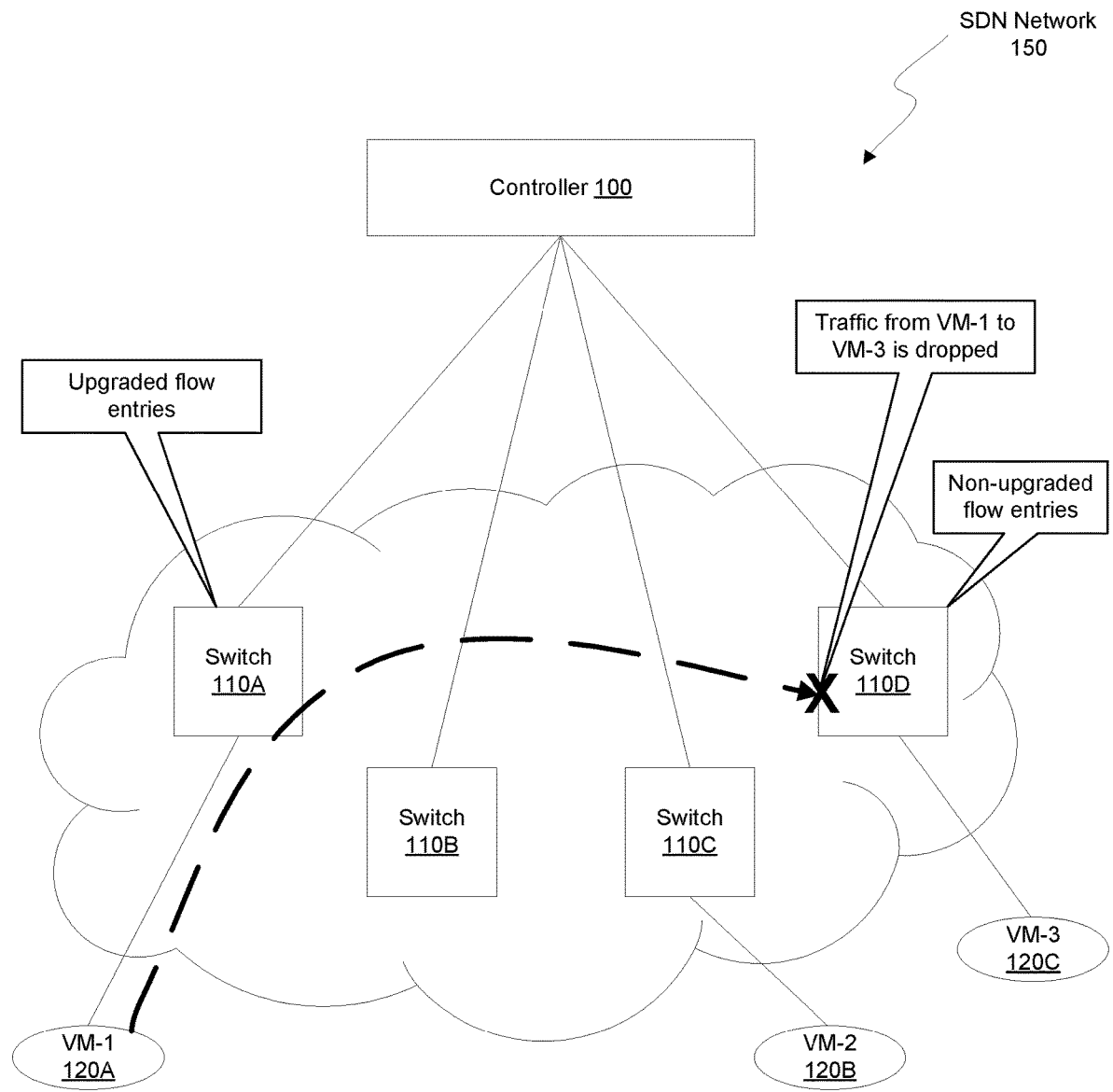
FIG. 1 is a block diagram illustrating a scenario where traffic interruption may occur in a software defined networking (SDN) network during a controller upgrade.

The following description describes methods and apparatus for achieving hitless resynchronization (resync) during a software defined networking (SDN) controller upgrade. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, when an SDN controller is upgraded, there can be a window of time where different switches in the SDN network have different versions of flow entries installed. For example, some of the switches may have non-upgraded flow entries installed, while some of the switches may have upgraded flow entries installed. Such inconsistent network state can cause problems with achieving hitless resync, and result in traffic interruption. FIG. 1 shows a scenario where such a problem may occur in an SDN network. As shown in FIG. 1 an SDN network 150 includes an SDN controller 100 (referred to herein simply as "controller") that manages a group of SDN switches (switches 110A-D) (referred to herein simply as "switches"). Virtual machine 120A (VM-1) is communicatively coupled to switch 110A, VM 120B (VM-2) is communicatively coupled to switch 110C, and VM 120C (VM-3) is communicatively coupled to switch 110D. When the controller 100 is upgraded, it may begin to program the switches 110 with upgraded flow entries (i.e., configure the switches 110 to install upgraded flow entries). However, there is no way to ensure that all of the switches 110 are programmed with upgraded flow entries at the exact same time. As a result, there can be a window of time during the controller upgrade (while the controller 100 is in the process of programming the switches 110 with upgraded flow entries) where some of the switches 110 have non-upgraded flow entries installed, while other switches 110 have upgraded flow entries installed. For example, as shown in the diagram, switch 110A has upgraded flow entries installed, while switch 110D has non-upgraded flow entries installed (e.g., because the controller 100 has yet to program switch 110D with upgraded flow entries). As shown in the diagram, if there is live traffic going from virtual machine 120A (VM-1) to virtual machine 120C (VM-3), there can be an interruption in traffic at switch 110D due to the incompatibility of the flow entries. For example, this may be the case if non-upgraded flow entries and upgraded flow entries use a different Virtual Extensible Local Area Network (VxLAN) identifier to refer to a particular VxLAN segment.

Existing mechanisms for achieving resync in an SDN network (e.g., bundle based resync and stale marking mechanism mentioned above) do not address this problem, as it is still possible with these mechanisms to have a window of time where different switches process packets using different versions of flow entries, which can lead to traffic interruption.

Embodiments disclosed herein overcome the disadvantages of existing resync mechanisms by providing a hitless resync mechanism that ensures no data plane outages occur during a controller upgrade. According to some embodiments, a switch that is managed by a controller is to process packets using a non-upgraded set of flow entries before a controller upgrade and process packets using an upgraded set of flow entries after the controller upgrade. During the controller upgrade, the switch maintains both the non-upgraded set of flow entries and the upgraded set of flow entries. The switch processes non-tunneled packets using the non-upgraded set of flow entries and processes tunneled packets using either the non-upgraded set of flow entries or the upgraded set of flow entries depending on a tunnel upgrade status indicator in a tunnel header (where the tunnel upgrade status indicator indicates whether a packet was processed by non-upgraded flow entries or upgraded flow entries at the previous switch). When all switches managed by the controller have installed upgraded flow entries, the switch transitions to processing non-tunneled packets using the upgraded set of flow entries. With this mechanism, all switches managed by the controller process packets using non-upgraded flow entries during the controller upgrade (before all of the switches have installed upgraded flow entries). After the controller upgrade (when all of the switches have installed upgraded flow entries), the switches can begin to process packets using upgraded flow entries. This mechanism achieves hitless resync, as it ensures that no data plane outages occur during the controller upgrade. Various embodiments are further described herein below.

Figure 2A:
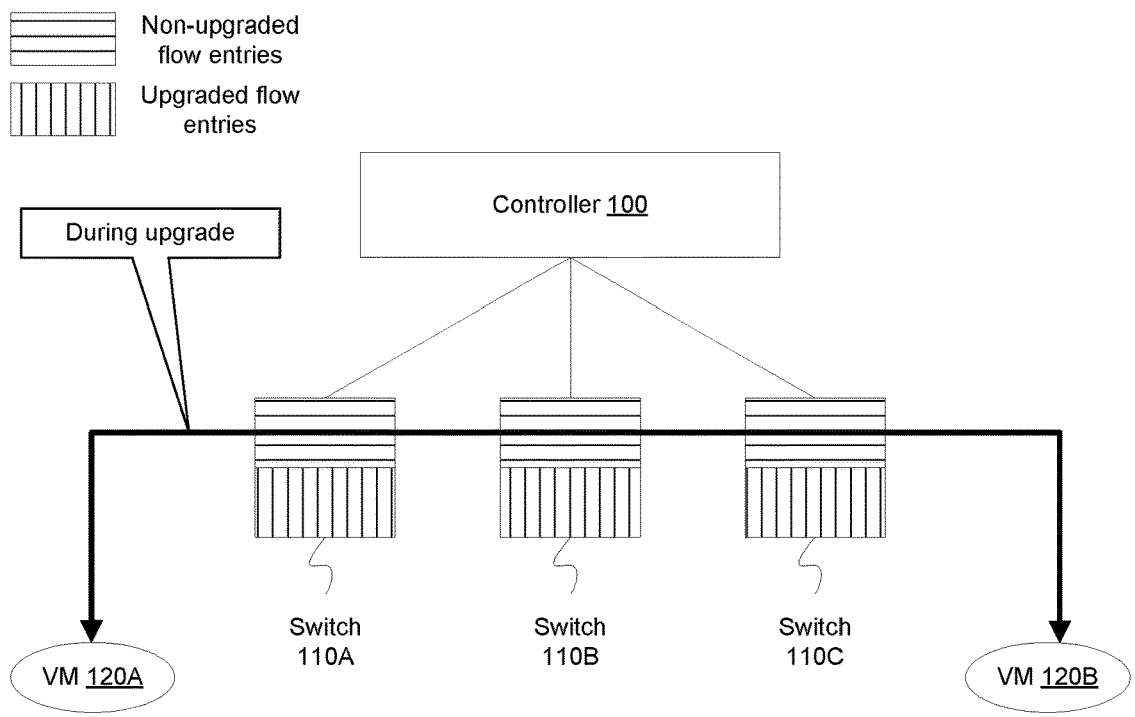
FIG. 2A is a block diagram illustrating how packets are processed in an SDN network during a controller upgrade, according to some embodiments.

FIG. 2A is a block diagram illustrating how packets are processed in an SDN network during a controller upgrade, according to some embodiments. As shown in the diagram, a controller 100 manages a group of switches (switches 110A-C). For purposes of illustration, the SDN network 150 is shown as including a single controller 100 and three switches 110. It should be understood, however, that the SDN network 150 may include more than one controller 100 and will typically include more than three switches 110. In one embodiment, one or more of the switches 110 can be implemented as a virtual switch (e.g., Open vSwitch). In one embodiment, the controller 100 manages the group of switches using a southbound protocol such as OpenFlow. For purposes of illustration, embodiments will primarily be described in a context where the controller 100 and the switches 110 implement OpenFlow. This is by way of example and not intended to be limiting. It should be understood that the hitless resync mechanisms and concepts described herein can also be implemented using other SDN implementations.

In one embodiment, during a controller upgrade, the controller 100 configures the switches 110 to install upgraded flow entries so that the switches 110 include upgraded flow entries as well as non-upgraded flow entries. Stated differently, the switches 110 maintain non-upgraded flow entries and upgraded flow entries in parallel during the controller upgrade. However, the controller 100 configures the switches 110 to process packets using non-upgraded flow entries until all of the switches 110 have installed upgraded flow entries. For example, as shown in the diagram, during the controller upgrade, packets being sent between VM 120A and VM 120B are processed by the switches 110 using non-upgraded flow entries. While the diagram shows that each of the switches 110 have non-upgraded flow entries and upgraded flow entries installed, it is possible during the controller upgrade that some switches 110 may only have non-upgraded flow entries installed (e.g., because they have yet to receive upgraded flow entries from the controller 100). Packets can still be processed correctly/consistently in these scenarios since all switches 110 will process packets using non-upgraded flow entries (regardless of whether they have upgraded flow entries installed).

Figure 2B:
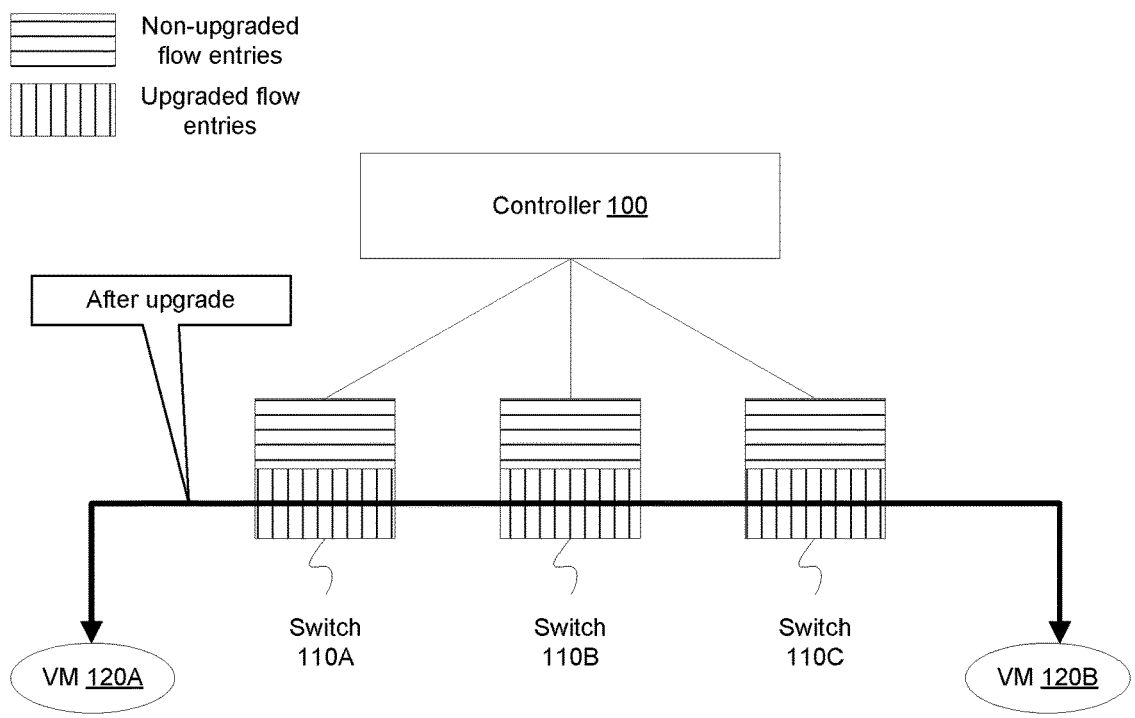
FIG. 2B is a block diagram illustrating how packets are processed in the SDN network after the controller upgrade, according to some embodiments.

FIG. 2B is a block diagram illustrating how packets are processed in the SDN network after the controller upgrade, according to some embodiments. When the controller 100 determines that all of the switches 110 have installed upgraded flow entries (controller upgrade has completed), it configures the switches 110 to begin processing packets using upgraded flow entries. For example, as shown in the diagram, packets being sent between VM 120A and VM 120B are processed using upgraded flow entries after the controller upgrade. It should be noted that the controller 100 cannot guarantee that all of the switches 110 will transition to using upgraded flow entries at the exact same time. As will become apparent from the descriptions provided herein below, embodiments handle the situation where some of the switches 110 have transitioned to using upgraded flow entries and some have not (such that a given packet is processed using either non-upgraded flow entries or upgraded flow entries, but not both).

Setting Up the Upgrade Status Indicators Before the Controller Upgrade

In one embodiment, when a switch 110 receives a packet coming from a physical port (e.g., which is typically the case for a packet coming from a VM 120 attached to the switch 110 as opposed to a packet coming from another switch 110), the switch 110 sets a pipeline upgrade status indicator of the packet to indicate that the packet should be processed through the packet processing pipeline of the switch 110 using non-upgraded flow entries. This is typically done at the beginning of the packet processing pipeline (e.g., table-0 in OpenFlow packet processing pipeline) before sending the packet to the dispatcher table (the flow table at which packets are dispatched to the appropriate flow table in the packet processing pipeline). In one embodiment, the pipeline upgrade status indicator of the packet is a bit in a metadata field associated with the packet (e.g., any of the 64 bits in the OpenFlow metadata field). In such an embodiment, the value of the bit may be set to '1' to indicate that the packet is to be processed using non-upgraded flow entries and set to '0' to indicate that the packet is to be processed using upgraded flow entries. Packets that come from a physical port may be referred to herein as non-tunneled packets.

Figure 3:
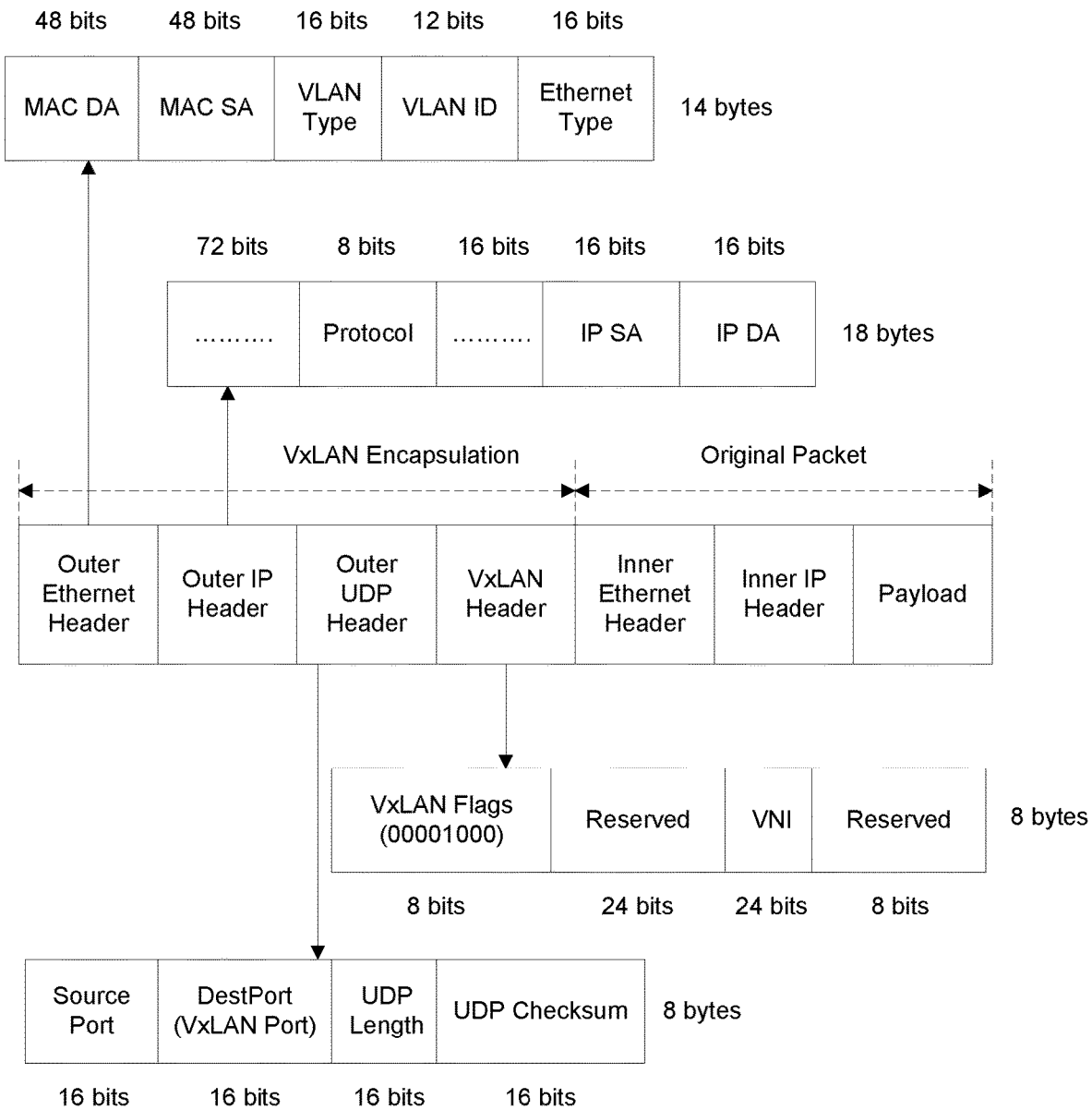
FIG. 3 shows a field format of a Virtual Extensible Local Area Network (VxLAN) encapsulated packet, according to some embodiments.

In one embodiment, when the switch 110 receives a packet coming from a tunnel port (e.g., which is typically the case for a packet coming from another switch 110 as opposed to a packet coming from a VM 120), the switch 110 sets the pipeline upgrade status indicator of the packet based on the value of a tunnel upgrade status indicator in the tunnel header of the packet (e.g., copies the value of the tunnel upgrade status indicator of the packet to the pipeline upgrade status indicator). This is typically done at the beginning of the packet processing pipeline (e.g., table-0 in OpenFlow packet processing pipeline) before sending the packet to the dispatcher table. The tunnel upgrade status indicator indicates whether a (tunneled) packet was processed by non-upgraded flow entries or upgraded flow entries at the previous switch 110. In an embodiment where the tunnel header is a VxLAN header, the tunnel upgrade status indicator may be a reserved bit in the VxLAN header. In such an embodiment, if the value of the bit is set to ' 1', this indicates that the packet was processed by non-upgraded flow entries at the previous switch 110. Otherwise, if the value of the bit is set to '0', this indicates that the packet was processed by upgraded flow entries at the previous switch 110. FIG. 3 shows a field format of a VxLAN encapsulated packet, according to some embodiments. As shown in the diagram, the VxLAN header includes 24 bits that are reserved (between the VxLAN Flags field and the VxLAN Network Identifier (VNI) field). Any of these bits can be used as a tunnel upgrade status indicator. Setting the pipeline upgrade status indicator based on the value of the tunnel upgrade status indicator allows the packet to be processed through the packet processing pipeline of the switch 110 using the same version of flow entries (non-upgraded flow entries or upgraded flow entries) that was used at the previous switch 110. Packets that come from a tunnel port may be referred to herein as tunneled packets. While an embodiment using a VxLAN tunneling mechanism is described above, it should be understood that embodiments may also work with other types of tunneling mechanisms (e.g., Generic Routing Encapsulation (GRE)).

Table I shows exemplary flow entries that can be included at the beginning of the packet processing pipeline (e.g., table-0 in OpenFlow packet processing pipeline) of the switch 110 to set up the upgrade status indicators.

TABLE I

| Match Condition | Instructions |
| --- | --- |
| in_port = physical_port | Set pipeline upgrade status indicator (to indicate that packet is to be processed using non-upgraded flow entries); and Goto dispatcher table |
| in_port = tunnel_port | Copy value of tunnel upgrade status indicator to pipeline upgrade status indicator; and Goto dispatcher table |

In one embodiment, the switch 110 sets the tunnel upgrade status indicator in the tunnel header for a packet that is to be tunneled out the switch 110 to indicate to the next switch that the packet was processed using non-upgraded flow entries. This can be accomplished, for example, by adding an instruction to set the value of the tunnel upgrade status indicator wherever there is an instruction to set a tunnel identifier in a tunnel header. Table II and Table III show exemplary flow entries before and after such modification, respectively.

TABLE II

| Match Condition | Instructions |
| --- | --- |
| Match-condition-1 | Set tunnel ID to 1000 and output on port 4 |
| Match-condition-2 | Set tunnel ID to 2000 and output on port 5 |

TABLE III

| Match Condition | Instructions |
| --- | --- |
| Match-condition-1 | Set tunnel upgrade status indicator (to indicate that packet was processed using non-upgraded flow entries); and Set tunnel ID to 1000 and output on port 4 |
| Match-condition-2 | Set tunnel upgrade status indicator (to indicate that packet was processed using non-upgraded flow entries); and Set tunnel ID to 2000 and output on port 5 |

Installing Upgraded Flow Entries During the Controller Upgrade

In one embodiment, the switch 110 installs upgraded flow entries during the controller upgrade so that the switch 110 includes upgraded flow entries as well as non-upgraded flow entries (the switch 110 maintains both non-upgraded flow entries and upgraded flow entries in parallel). In one embodiment, all upgraded flow entries have a match condition that a pipeline upgrade status indicator is not set (e.g., has a value of '0'-indicating that the packet should be processed through the packet processing pipeline of the switch 110 using upgraded flow entries) so that packets that have their pipeline upgrade status indicator set (e.g., has a value of '1'—indicating that the packet should be processed through the packet processing pipeline of the switch 110 using non-upgraded flow entries) do not use upgraded flow entries (and instead use non-upgraded flow entries). Table IV and Table V show exemplary flow entries before upgraded flow entries are installed and after upgraded flow entries are installed, respectively.

TABLE IV

| Match Condition | Instructions |
| --- | --- |
| dest_IP = 10.1.1.1 | Instruction-list-1 |
| dest_IP = 20.1.1.1 | Instruction-list-2 |

TABLE V

| Match Condition | Instructions |
| --- | --- |
| dest_IP = 10.1.1.1 && pipeline upgrade status indicator is not set | Instruction-list-3 |
| dest_IP = 20.1.1.1 && pipeline upgrade status indicator is not set | Instruction-list-4 |
| dest_IP = 10.1.1.1 | Instruction-list-1 |
| dest_IP = 20.1.1.1 | Instruction-list-2 |

As shown in Table V, the upgraded flow entries (the first two flow entries in Table V), include a match condition that a pipeline upgrade status indicator is not set. Since all packets entering the switch 110 during the controller upgrade will have their pipeline upgrade status indicator set (at the beginning of the packet processing pipeline to indicate that the packet should be processed using non-upgraded flow entries), they will not match upgraded flow entries and thus be processed using non-upgraded flow entries (e.g., the third and fourth flow entries in Table V). Also, it should be noted that in contrast to packets that are processed using non-upgraded flow entries, a packet that is processed using upgraded flow entries will be tunneled to the next switch 110 without setting the tunnel upgrade status indicator in the tunnel header of the packet (which indicates to the next switch 110 that the packet was processed using upgraded flow entries).

Transitioning to Using Upgraded Flow Entries after the Controller Upgrade

In one embodiment, when the controller 100 determines that all of the switches 110 managed by the controller 100 have installed upgraded flow entries, the controller 100 configures the switches 110 to start processing packets using upgraded flow entries. In one embodiment, the controller 100 determines that all switches 110 managed by the controller 100 have installed upgraded flow entries based on a determination that all of the switches 110 have installed a test flow entry that is known (e.g., by the controller 100) to be included only in upgraded flow entries (and not included in non-upgraded flow entries). In one embodiment, the controller 100 configures a switch 110 to start processing packets using upgraded flow entries by removing the instruction to set the pipeline upgrade status indicator of packets coming from a physical port. Table VI shows how the first flow entry shown in Table I can be modified to begin processing packets using upgraded flow entries.

TABLE VI

| Match Condition | Instructions |
| --- | --- |
| in_port = physical_port | Goto dispatcher table |
| in_port = tunnel_port | Copy value of tunnel upgrade status indicator to pipeline upgrade status indicator; and Goto dispatcher table |

It should be noted that the controller 100 cannot guarantee that all of the switches 110 managed by the controller 100 will transition to using upgraded flow entries at the exact same time. Embodiments handle the scenario where some switches have transitioned to using upgraded flow entries and some have not. Such a scenario is shown in FIG. 4.

Figure 4:
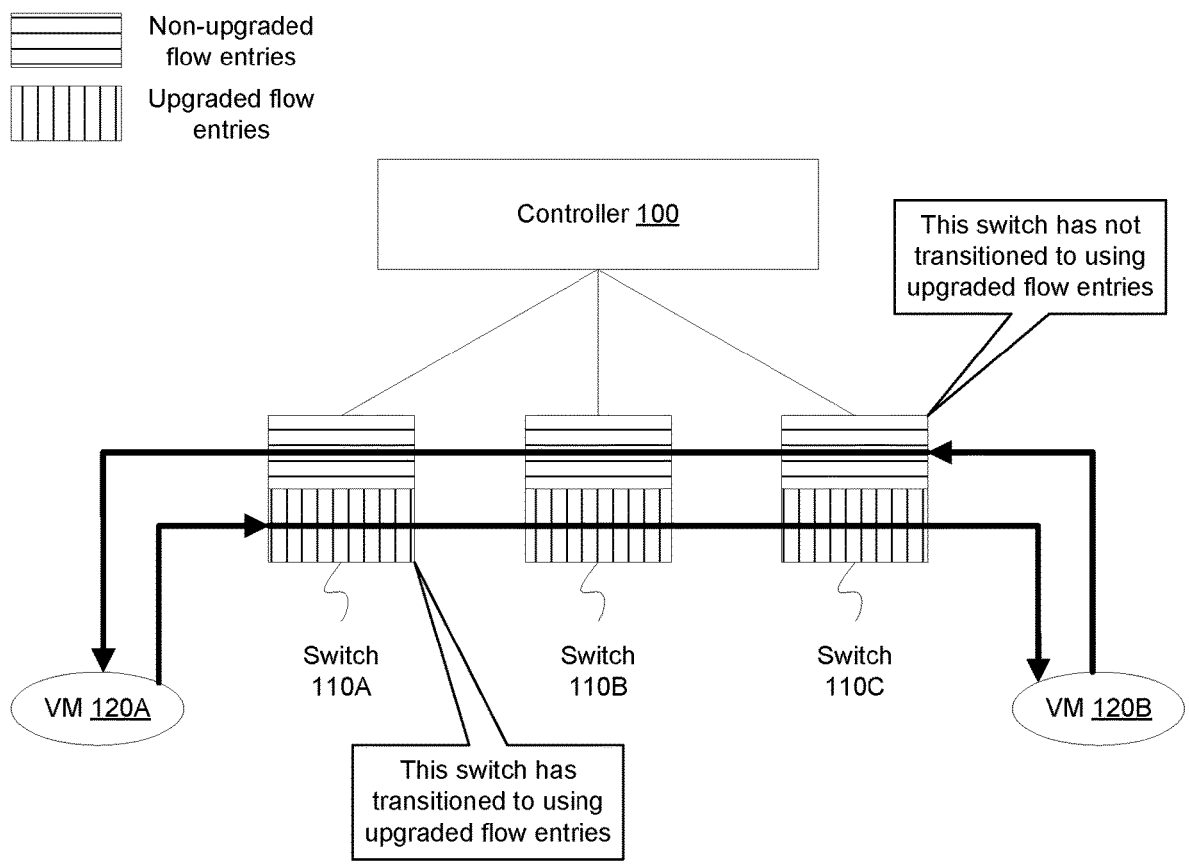
FIG. 4 is a block diagram illustrating how packets are processed when one switch on a traffic path has transitioned to using upgraded flow entries and another switch on the traffic path has not transitioned to using upgraded flow entries, according to some embodiments.

FIG. 4 is a block diagram illustrating how packets are processed when one switch on a traffic path has transitioned to using upgraded flow entries and another switch on the traffic path has not transitioned to using upgraded flow entries, according to some embodiments. As shown in the diagram, switch 110A has transitioned to using upgraded flow entries, while switch 110C has not transitioned to using upgraded flow entries. In this example, VM 120A may send a packet intended for VM 120B by forwarding the packet to switch 110A. Since switch 110A has transitioned to using upgraded flow entries, it will process the packet using upgraded flow entries and tunnel the packet to switch 110B without setting the tunnel upgrade status indicator (which indicates that the packet was processed using upgraded flow entries). Since the tunnel upgrade status indicator is not set, switch 110B will process the packet using upgraded flow entries and tunnel the packet to switch 110C without setting the tunnel upgrade status indicator. Similarly, since the tunnel upgrade status indicator is not set, switch 110C will process the packet using upgraded flow entries (even though switch 110C has not transitioned to using upgraded flow entries yet) and forward the packet to VM 120B. As a result, the packet is processed using upgraded flow entries at each switch 110.

Also, as another example, VM 120B may send a packet intended for VM 120A by forwarding the packet to switch 110C. However, in this example, since switch 110C has not transitioned to using upgraded flow entries, it will process the packet using non-upgraded flow entries and tunnel the packet to switch 110B with the tunnel upgrade status indicator set (indicating that the packet was processed using non-upgraded flow entries). Since the tunnel upgrade status indicator is set, switch 110B will process the packet using non-upgraded flow entries and tunnel the packet to switch 110A with the tunnel upgrade status indicator set. Similarly, since the tunnel upgrade status indicator is set, switch 110A will process the packet using non-upgraded flow entries (even though switch 110A has transitioned to using upgraded flow entries yet) and forward the packet to VM 120A. As a result, the packet is processed using non-upgraded flow entries.

Removing Non-Upgraded Flow Entries

In one embodiment, the switch 110 removes non-upgraded flow entries when they have not been matched for a threshold length of time (which indicates that all of the switches 110 managed by the same controller 100 have likely transitioned to using upgraded flow entries). In one embodiment, the switch 110 also removes the match condition in upgraded flow entries that checks for the pipeline upgrade status indicator is not set (e.g., first and second flow entries shown in Table V).

Figure 5:
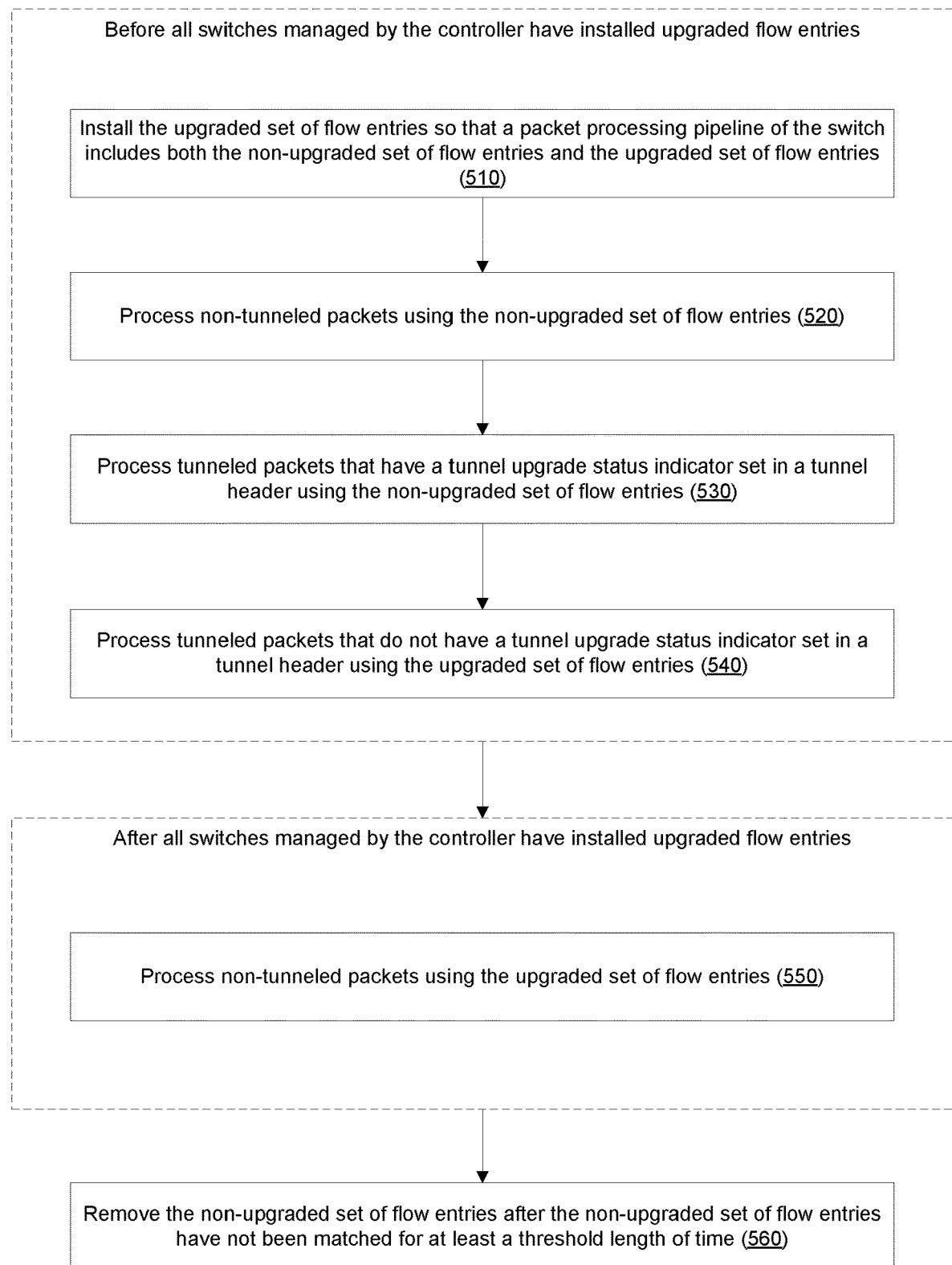
FIG. 5 is a flow diagram of a process by a switch to achieve hitless resync during a controller upgrade, according to some embodiments.

FIG. 5 is a flow diagram of a process by a switch to achieve hitless resync during a controller upgrade, according to some embodiments. In one embodiment, the process is implemented by a switch in an SDN network (e.g., switch 110) that is managed by a controller (e.g., controller 100), where the switch is to process packets using a non-upgraded set of flow entries before the controller upgrade and is to process packets using an upgraded set of flow entries after the controller upgrade. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

The operations of blocks 510-540 are performed before all of the switches managed by the controller have installed upgraded flow entries. At block 510, the switch installs the upgraded set of flow entries so that a packet processing pipeline of the switch includes both the non-upgraded set of flow entries and the upgraded set of flow entries. At block 520, the switch processes non-tunneled packets using the non-upgraded set of flow entries. In one embodiment, the switch sets a pipeline upgrade status indicator of a non-tunneled packet (e.g., to a value of '1') to cause the non-tunneled packet to be processed using the non-upgraded set of flow entries. In such an embodiment, each flow entry in the upgraded set of flow entries may include a match condition that a pipeline upgrade status indicator is not set (e.g., not set to a value of '1') so that packets that have their pipeline upgrade indicator set (e.g., to a value of '1') do not match on the upgraded set of flow entries (and instead match on the non-upgraded set of flow entries). In one embodiment, the pipeline upgrade status indicator of the non-tunneled packet is a bit in a metadata field associated with the non-tunneled packet. At block 530, the switch processes tunneled packets that have a tunnel upgrade status indicator set in a tunnel header (indicating that these packets were processed using non-upgraded flow entries at the previous switch) using the non-upgraded set of flow entries. In one embodiment, the non-upgraded set of flow entries includes a flow entry that includes an instruction to set a tunnel upgrade status indicator in a tunnel header of a packet that is to be tunneled out of the switch (indicating that the packet was processed by non-upgraded flow entries). At block 540, the switch processes tunneled packets that do not have a tunnel upgrade indicator set in a tunnel header (indicating that these packets were processed using upgraded flow entries at the previous switch) using the upgraded set of flow entries. In one embodiment, the tunnel header is a VxLAN header and the tunnel upgrade status indicator is a reserved bit in the VxLAN header. In one embodiment, the switch sets a value of a pipeline upgrade status indicator of a tunneled packet to a value of a tunnel upgrade status indicator in a tunnel header of the tunneled packet to cause the tunneled packet to be processed using either the non-upgraded set of flow entries or the upgraded set of flow entries depending on the value of the tunnel upgrade status indicator in the tunnel header of the tunneled packet. In one embodiment, the pipeline upgrade status indicator of the tunneled packet is a bit in a metadata field associated with the tunneled packet. While blocks 520-540 are arranged in the flow diagram in a particular order, it should be understood that the operations of these blocks need not be performed in the order shown. The operations of different ones of the blocks can be performed depending on the packet that is received by the switch.

After all switches managed by the controller have installed upgraded flow entries, at block 550, the switch processes non-tunneled packets using the upgraded set of flow entries (to transition to using upgraded flow entries).

At block 560, the switch removes the non-upgraded set of flow entries after the non-upgraded set of flow entries have not been matched for at least a threshold length of time.

Figure 6:
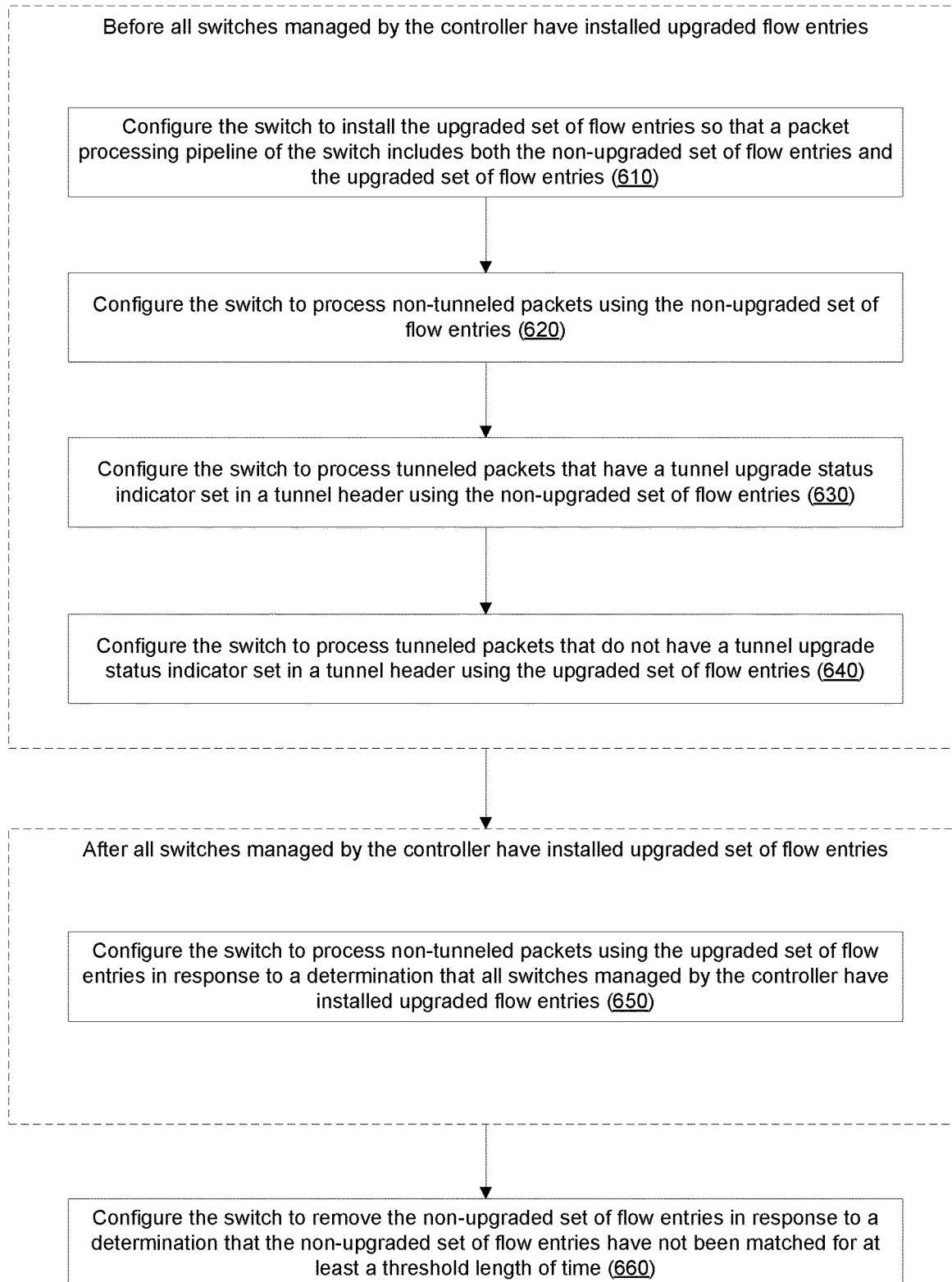
FIG. 6 is a flow diagram of a process by a controller to achieve hitless resync during a controller upgrade, according to some embodiments.

FIG. 6 is a flow diagram of a process by a controller to achieve hitless resync during a controller upgrade, according to some embodiments. In one embodiment, the process is implemented by a controller in an SDN network (e.g., controller 100) that manages a switch (e.g., switch 110), where the switch is to process packets using a non-upgraded set of flow entries before the controller upgrade and is to process packets using an upgraded set of flow entries after the controller upgrade.

The operations of blocks 610-640 are performed before all of the switches managed by the controller have installed upgraded flow entries. At block 610, the controller configures the switch to install the upgraded set of flow entries so that a packet processing pipeline of the switch includes both the non-upgraded set of flow entries and the upgraded set of flow entries. At block 620, the controller configures the switch to process non-tunneled packets using the non-upgraded set of flow entries. At block 630, the controller configures the switch to process tunneled packets that have a tunnel upgrade status indicator set in a tunnel header (indicating that these packets were processed using non-upgraded flow entries at the previous switch) using the non-upgraded set of flow entries. In one embodiment, the non-upgraded set of flow entries includes a flow entry that includes an instruction to set a tunnel upgrade status indicator in a tunnel header of a packet that is to be tunneled out of the switch (indicating that the packet was processed by non-upgraded flow entries). At block 640, the controller configures the switch to process tunneled packets that do not have a tunnel upgrade indicator set in a tunnel header (indicating that these packets were processed using upgraded flow entries at the previous switch) using the upgraded set of flow entries. In one embodiment, the tunnel header is a VxLAN header and the tunnel upgrade status indicator is a reserved bit in the VxLAN header. While blocks 620-640 are arranged in the flow diagram in a particular order, it should be understood that the operations of these blocks need not be performed in the order shown.

After all switches managed by the controller have installed upgraded flow entries, at block 650, the controller configures the switch to process non-tunneled packets using the upgraded set of flow entries in response to a determination that all switches managed by the controller have installed upgraded flow entries.

At block 660, the controller configures the switch to remove the non-upgraded set of flow entries in response to a determination that the non-upgraded set of flow entries have not been matched for at least a threshold length of time. In one embodiment, the determination that all switches managed by the controller have installed upgraded flow entries is based on a determination that all switches managed by the controller include a test flow entry, wherein the test flow entry is a flow entry that is known to be included only in upgraded flow entries.

FIG. 7A illustrates connectivity between network devices (NDs) within an exemplary network, as well as three exemplary implementations of the NDs, according to some embodiments. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

Software 720 can include code such as hitless resync component 725, which when executed by networking hardware 710, causes the special-purpose network device 702 to perform operations of one or more embodiments described herein above as part networking software instances 722 (e.g., to provide hitless resync functionality described herein).

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

Software 750 can include code such as hitless resync component 763, which when executed by processor(s) 742, cause the general purpose network device 704 to perform operations of one or more embodiments described herein above as part software instances 762A-R (e.g., to provide hitless resync functionality described herein).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
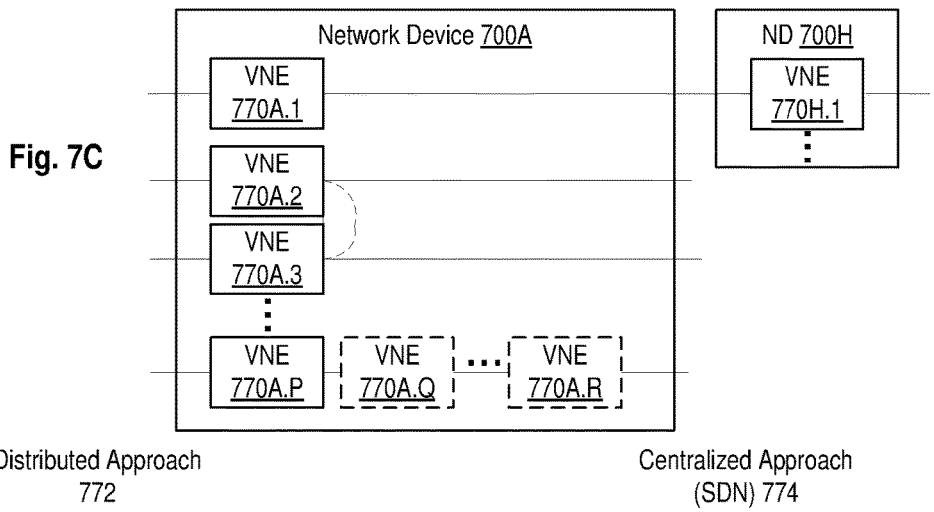
FIG. 7C illustrates various exemplary ways in which virtual network elements (VNEs) may be coupled according to some embodiments.

FIG. 7C illustrates various exemplary ways in which VNEs may be coupled according to some embodiments. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
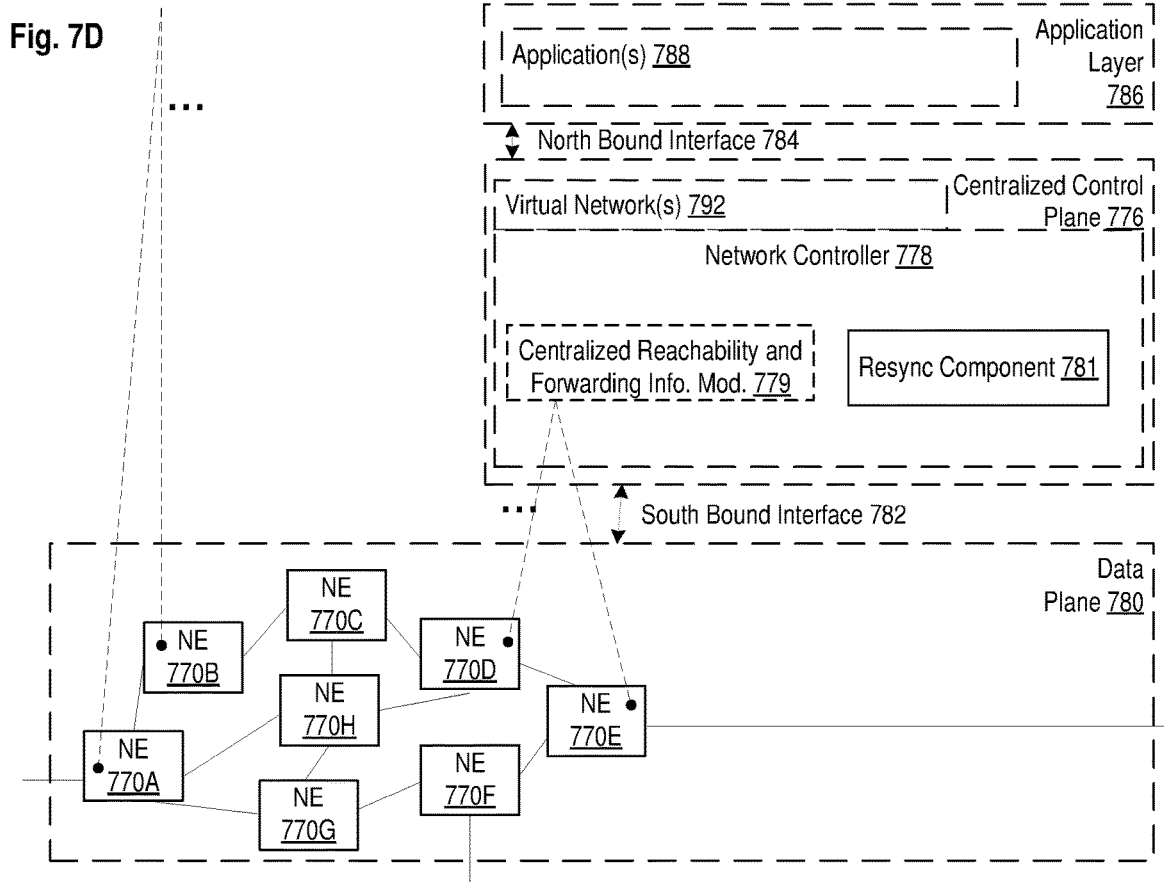
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

In one embodiment, the network controller 778 may include a hitless resync component 781 that when executed by the network controller 778, causes the network controller 778 to perform operations of one or more embodiments described herein above (e.g., to provide hitless resync functionality described herein).

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
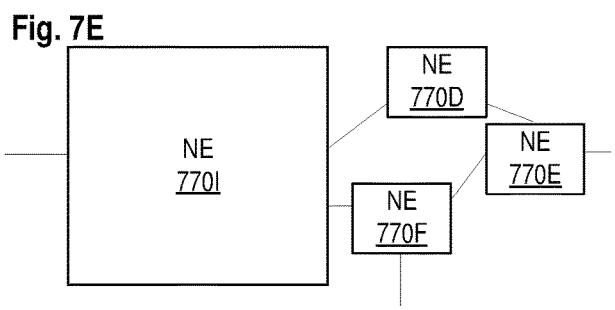
FIG. 7E illustrates the simple case of where each of the NDs implements a single NE, but a centralized control plane has abstracted multiple of the NEs in different NDs into (to represent) a single NE in one of the virtual network(s), according to some embodiments.
Figure 7F:
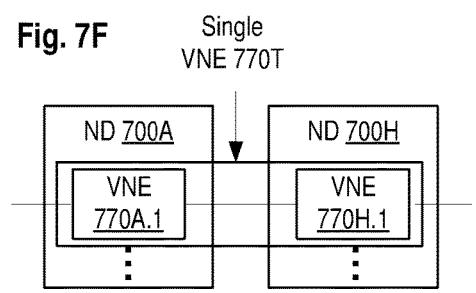
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments. Thus, the abstraction of a NE or VNE can span multiple NDs.

While some embodiments implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
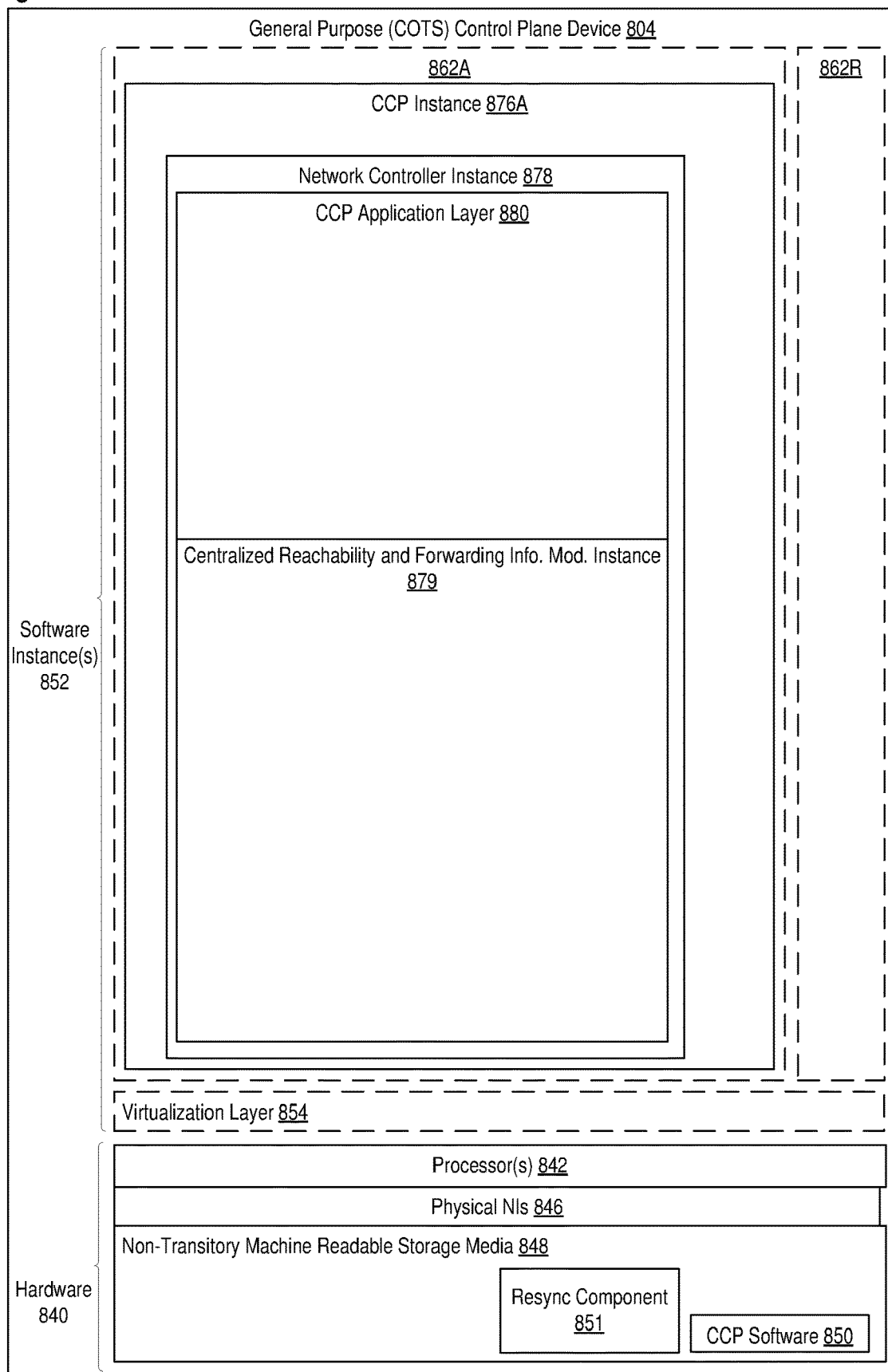
FIG. 8 illustrates a general purpose control plane device with centralized control plane (CCP) software 850), according to some embodiments.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850 and a hitless resync component 851.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view.

The hitless resync component 851 can be executed by hardware 840 to perform operations of one or more embodiments described herein above as part of software instances 852 (e.g., to provide hitless resync functionality described herein).

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments as described herein.

An embodiment may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A method, by a switch in a software defined networking (SDN) network managed by a controller, to achieve hitless resynchronization during a controller upgrade; wherein the switch is to process packets using a non-upgraded set of flow entries before the controller upgrade; wherein the switch is to process packets using an upgraded set of flow entries after the controller upgrade; the method comprising:
   installing the upgraded set of flow entries so that a packet processing pipeline of the switch includes both the non-upgraded set of flow entries and the upgraded set of flow entries;
   processing non-tunneled packets using the non-upgraded set of flow entries;
   processing tunneled packets that have a tunnel upgrade status indicator set in a tunnel header using the non-upgraded set of flow entries, while processing tunneled packets that do not have the tunnel upgrade status indicator set in the tunnel header using the upgraded set of flow entries; and
   processing non-tunneled packets using the upgraded set of flow entries after all switches managed by the controller have installed upgraded flow entries.

2. The method of claim 1, wherein the non-upgraded set of flow entries includes a flow entry that includes an instruction to set a tunnel upgrade status indicator in a tunnel header of a packet that is to be tunneled out of the switch.

3. The method of claim 2, wherein the tunnel header is a Virtual Extensible Local Area Network (VxLAN) header; and wherein the tunnel upgrade status indicator is a reserved bit in the VxLAN header.

4. The method of claim 1, further comprising removing the non-upgraded set of flow entries after the non-upgraded set of flow entries have not been matched for at least a threshold length of time.

5. The method of claim 1, further comprising setting a pipeline upgrade status indicator of a non-tunneled packet to cause the non-tunneled packet to be processed using the non-upgraded set of flow entries.

6. The method of claim 5, wherein each flow entry in the upgraded set of flow entries includes a match condition that a pipeline upgrade status indicator is not set.

7. The method of claim 5, wherein the pipeline upgrade status indicator of the non-tunneled packet is a bit in a metadata field associated with the non-tunneled packet.

8. The method of claim 5, further comprising setting a value of a pipeline upgrade status indicator of a tunneled packet to a value of a tunnel upgrade status indicator in a tunnel header of the tunneled packet to cause the tunneled packet to be processed using either the non-upgraded set of flow entries or the upgraded set of flow entries depending on the value of the tunnel upgrade status indicator in the tunnel header of the tunneled packet.

9. The method of claim 8, wherein the pipeline upgrade status indicator of the tunneled packet is a bit in a metadata field associated with the tunneled packet.

10. A method, by a controller in a software defined networking (SDN) network, to achieve hitless resynchronization of a switch during a controller upgrade;
wherein the switch is to process packets using a non-upgraded set of flow entries before the controller upgrade; wherein the switch is to process packets using an upgraded set of flow entries after the controller upgrade; the method comprising:
configuring the switch to install the upgraded set of flow entries so that a packet processing pipeline of the switch includes both the non-upgraded set of flow entries and the upgraded set of flow entries;
configuring the switch to process non-tunneled packets using the non-upgraded set of flow entries;
configuring the switch to process tunneled packets that have a tunnel upgrade status indicator set in a tunnel header using the non-upgraded set of flow entries;
configuring the switch to process tunneled packets that do not have the tunnel upgrade status indicator set in the tunnel header using the upgraded set of flow entries; and
configuring the switch to process non-tunneled packets using the upgraded set of flow entries in response to a determination that all switches managed by the controller have installed upgraded flow entries.

11. The method of claim 10, wherein the non-upgraded set of flow entries includes a flow entry that includes an instruction to set a tunnel upgrade status indicator in a tunnel header of a packet that is to be tunneled out of the switch.

12. The method of claim 11, wherein the tunnel header is a Virtual Extensible Local Area Network (VxLAN) header; and wherein the tunnel upgrade status indicator is a reserved bit in the VxLAN header.

13. The method of claim 10, further comprising configuring the switch to remove the non-upgraded set of flow entries in response to a determination that the non-upgraded set of flow entries have not been matched for at least a threshold length of time.

14. The method of claim 10, wherein the determination that all switches managed by the controller have installed upgraded flow entries is based on a determination that all switches managed by the controller include a test flow entry; and
wherein the test flow entry is a flow entry that is known to be included only in upgraded flow entries.

15. A network device to function as a switch managed by a controller in a software defined networking (SDN) network to achieve hitless resynchronization during a controller upgrade; wherein the switch is to process packets using a non-upgraded set of flow entries before the controller upgrade; wherein the switch is to process packets using an upgraded set of flow entries after the controller upgrade; the network device comprising:
processing circuitry; and
a non-transitory machine-readable storage medium having stored therein a resync component which, when executed by the processing circuitry, causes the switch to:
install the upgraded set of flow entries so that a packet processing pipeline of the switch includes both the non-upgraded set of flow entries and the upgraded set of flow entries;
process non-tunneled packets using the non-upgraded set of flow entries;
process tunneled packets that have a tunnel upgrade status indicator set in a tunnel header using the non-upgraded set of flow entries while processing tunneled packets that do not have the tunnel upgrade status indicator set in the tunnel header using the upgraded set of flow entries; and
process non-tunneled packets using the upgraded set of flow entries after all switches managed by the controller have installed upgraded flow entries.

16. The network device of claim 15, wherein the resync component, when executed by the processing circuitry, further causes the switch to remove the non-upgraded set of flow entries after the non-upgraded set of flow entries have not been matched for at least a threshold length of time.

17. A network device to function as a controller in a software defined networking (SDN) network to achieve hitless resynchronization of a switch during a controller upgrade; wherein the switch is to process packets using a non-upgraded set of flow entries before the controller upgrade; wherein the switch is to process packets using an upgraded set of flow entries after the controller upgrade; the network device comprising:
processing circuitry; and
a non-transitory machine-readable storage medium having stored therein a resync component which, when executed by the processing circuitry, causes the network device to:
configure the switch to install the upgraded set of flow entries so that a packet processing pipeline of the switch includes both the non-upgraded set of flow entries and the upgraded set of flow entries;
configure the switch to process non-tunneled packets using the non-upgraded set of flow entries;
configure the switch to process tunneled packets that have a tunnel upgrade status indicator set in a tunnel header using the non-upgraded set of flow entries;
configure the switch to process tunneled packets that do not have the tunnel upgrade status indicator set in the tunnel header using the upgraded set of flow entries; and
configure the switch to switch to processing non-tunneled packets using the upgraded set of flow entries in response to a determination that all switches managed by the controller have installed upgraded flow entries.

18. The network device of claim 17, wherein the resync component, when executed by the processing circuitry, further causes the network device to configure the switch to remove the non-upgraded set of flow entries in response to a determination that the non-upgraded set of flow entries have not been matched for at least a threshold length of time.

\* \* \* \* \*